US011850956B2

(12) United States Patent
Jadhav et al.

(10) Patent No.: US 11,850,956 B2
(45) Date of Patent: Dec. 26, 2023

(54) BATTERY ARRANGEMENT OF A COMPACT ELECTRIC TRACTOR

(71) Applicant: Deere & Company, Moline, IL (US)

(72) Inventors: Vikas V. Jadhav, Sanpada (IN); Sudip Kandke, Thane (IN); Gaurav Dusane, Pune (IN); Subhabrata Gupta, Pune (IN); Bhupesh Agrawal, Udaipur (IN); Saravanan Stallin, Pune (IN); Navneet Garg, Sampla (IN)

(73) Assignee: DEERE & COMPANY, Moline, IL (US)

( * ) Notice: Subject to any disclaimer, the term of this patent is extended or adjusted under 35 U.S.C. 154(b) by 144 days.

(21) Appl. No.: 17/302,882

(22) Filed: May 14, 2021

(65) Prior Publication Data

US 2022/0363145 A1 Nov. 17, 2022

(51) Int. Cl.
*B60K 1/04* (2019.01)
*B60L 50/60* (2019.01)
*H01M 50/249* (2021.01)
*H01M 16/00* (2006.01)
*H01M 50/502* (2021.01)

(52) U.S. Cl.
CPC ............. *B60L 50/66* (2019.02); *H01M 16/00* (2013.01); *H01M 50/249* (2021.01); *H01M 50/502* (2021.01); *B60L 2200/40* (2013.01); *B60L 2240/547* (2013.01)

(58) Field of Classification Search
CPC ................. B60L 50/66; B60L 2200/40; B60L 2240/547; B60L 1/00; B60L 50/64; H01M 16/00; H01M 50/249; H01M 50/502
See application file for complete search history.

(56) References Cited

U.S. PATENT DOCUMENTS

| | | |
|---|---|---|
| 3,219,887 A | 11/1965 | Gerg et al. |
| 4,317,497 A | 3/1982 | Alt et al. |
| 4,365,681 A | 12/1982 | Singh |
| 5,378,555 A | 1/1995 | Waters et al. |
| 5,392,873 A | 2/1995 | Masuyama et al. |
| 6,340,877 B1 * | 1/2002 | Mita ................. B60L 58/21 320/112 |
| 6,791,295 B1 | 9/2004 | Berels |
| 7,611,798 B2 | 11/2009 | Yoon et al. |
| 7,614,469 B2 | 11/2009 | Kumar et al. |
| 8,453,773 B2 | 6/2013 | Hill et al. |
| 8,540,282 B2 | 9/2013 | Yoda et al. |

(Continued)

FOREIGN PATENT DOCUMENTS

| | | |
|---|---|---|
| EP | 3778279 A1 | 2/2021 |
| JP | 5578014 B2 | 8/2014 |

OTHER PUBLICATIONS

Great Britain Search Report issued in Patent Application No. GB2205809.3, dated Oct. 13, 2022, in 04 pages.

*Primary Examiner* — Jason D Shanske
*Assistant Examiner* — James J Triggs

(57) ABSTRACT

An electric compact tractor powered by a plurality of lithium ion battery modules housed in a battery pack. A pair of electrical bus bars connect the plurality of lithium ion battery modules in the battery pack, and extend from the battery pack to electric motors for traction drive, implement drive and steering. A low voltage control circuit may be used for turning on the plurality of lithium ion battery modules in the battery pack.

15 Claims, 4 Drawing Sheets

(56) References Cited

U.S. PATENT DOCUMENTS

| | | |
|---|---|---|
| 8,815,429 B2 | 8/2014 | Hostler et al. |
| 8,881,853 B2 * | 11/2014 | Nitawaki ................ B60L 50/66 180/68.5 |
| 8,951,058 B2 | 2/2015 | Favero et al. |
| 8,952,664 B2 | 2/2015 | Lee et al. |
| 9,114,714 B2 | 8/2015 | Pham et al. |
| 9,196,882 B2 | 11/2015 | Seong et al. |
| 9,321,337 B2 | 4/2016 | Wang et al. |
| 9,321,340 B2 | 4/2016 | Maskew et al. |
| D763,193 S | 8/2016 | Tyler et al. |
| 9,475,440 B2 | 10/2016 | Gottschlich et al. |
| 9,520,587 B2 | 12/2016 | DeKeuster et al. |
| 9,564,663 B2 | 2/2017 | Kim et al. |
| 9,577,240 B2 | 2/2017 | Choi et al. |
| 9,630,514 B2 | 4/2017 | Ferrel et al. |
| 9,692,031 B2 | 6/2017 | Subramanian et al. |
| 9,722,223 B1 | 8/2017 | Maguire |
| 9,789,771 B2 | 10/2017 | Steele et al. |
| 9,963,028 B1 | 5/2018 | Pachore |
| 10,148,109 B2 | 12/2018 | Liu et al. |
| 10,170,739 B2 | 1/2019 | Schoenherr et al. |
| 10,784,487 B2 | 9/2020 | Yang |
| 2008/0280198 A1 | 11/2008 | Kumar et al. |
| 2010/0116570 A1 | 5/2010 | Sugawara et al. |
| 2010/0181129 A1 | 7/2010 | Hamidi |
| 2010/0200314 A1 | 8/2010 | Birke et al. |
| 2010/0266880 A1 | 10/2010 | Hirakawa et al. |
| 2011/0165451 A1 | 7/2011 | Kim et al. |
| 2011/0223458 A1 * | 9/2011 | Ferber, Jr. ........... H01M 50/213 429/99 |
| 2011/0262801 A1 | 10/2011 | Schwab |
| 2013/0000971 A1 | 1/2013 | Sakaki et al. |
| 2013/0264875 A1 | 10/2013 | Kaminsky et al. |
| 2014/0079977 A1 * | 3/2014 | Tsujimura ........... H01M 50/209 429/120 |
| 2014/0175869 A1 * | 6/2014 | Phillips ................... B60L 58/13 320/160 |
| 2016/0202204 A1 * | 7/2016 | Rodgers ........... G01N 33/48707 205/778 |
| 2016/0204404 A1 * | 7/2016 | Shimizu ............... H01M 50/342 429/82 |
| 2020/0404804 A1 * | 12/2020 | Stoltz ................. H05K 7/20254 |
| 2022/0094190 A1 | 3/2022 | McCord et al. |

* cited by examiner

BATTERY ARRANGEMENT OF A COMPACT ELECTRIC TRACTOR

FIELD OF THE INVENTION

This invention relates to an electric compact tractor with lithium ion batteries to provide electrical power for traction drive and implements.

BACKGROUND OF THE INVENTION

Lithium ion batteries may provide power for traction drive and implements on electric compact tractors. Electric compact tractors have limited space for multiple battery modules. A battery housing for an electric compact tractor is needed that is compact in size, prevents structural damage, absorbs shock loads, and is easy to manufacture and service multiple battery modules.

Electric compact tractors require electrical cables connecting the battery modules, battery management system, power distribution unit, and electric motors. However, compact tractors do not have space for cables with 25-30 mm diameter for power flow requirements. There also is a need to prevent short circuits or overloads during factor assembly, service or operation. Additionally, a low voltage control circuit is needed to enable the use of higher voltage lithium ion batteries.

SUMMARY OF THE INVENTION

An electric compact tractor with a plurality of lithium ion battery modules and a battery management system connected to a positive electrical bus bar and a negative electrical bus bar inside a battery pack and extending rearwardly from the battery pack. A traction dive motor and a power take off motor are connected to the positive electrical bus bar and the negative electrical bus bar and powered by the lithium ion battery modules. A low voltage control circuit including a lead acid battery connected enables use of the plurality of lithium ion battery modules and battery management system. Six of the battery modules are mounted side by side in a vertical alignment and one battery module is mounted horizontally above the other six battery modules.

DESCRIPTION OF THE PREFERRED EMBODIMENT

Figure 1:
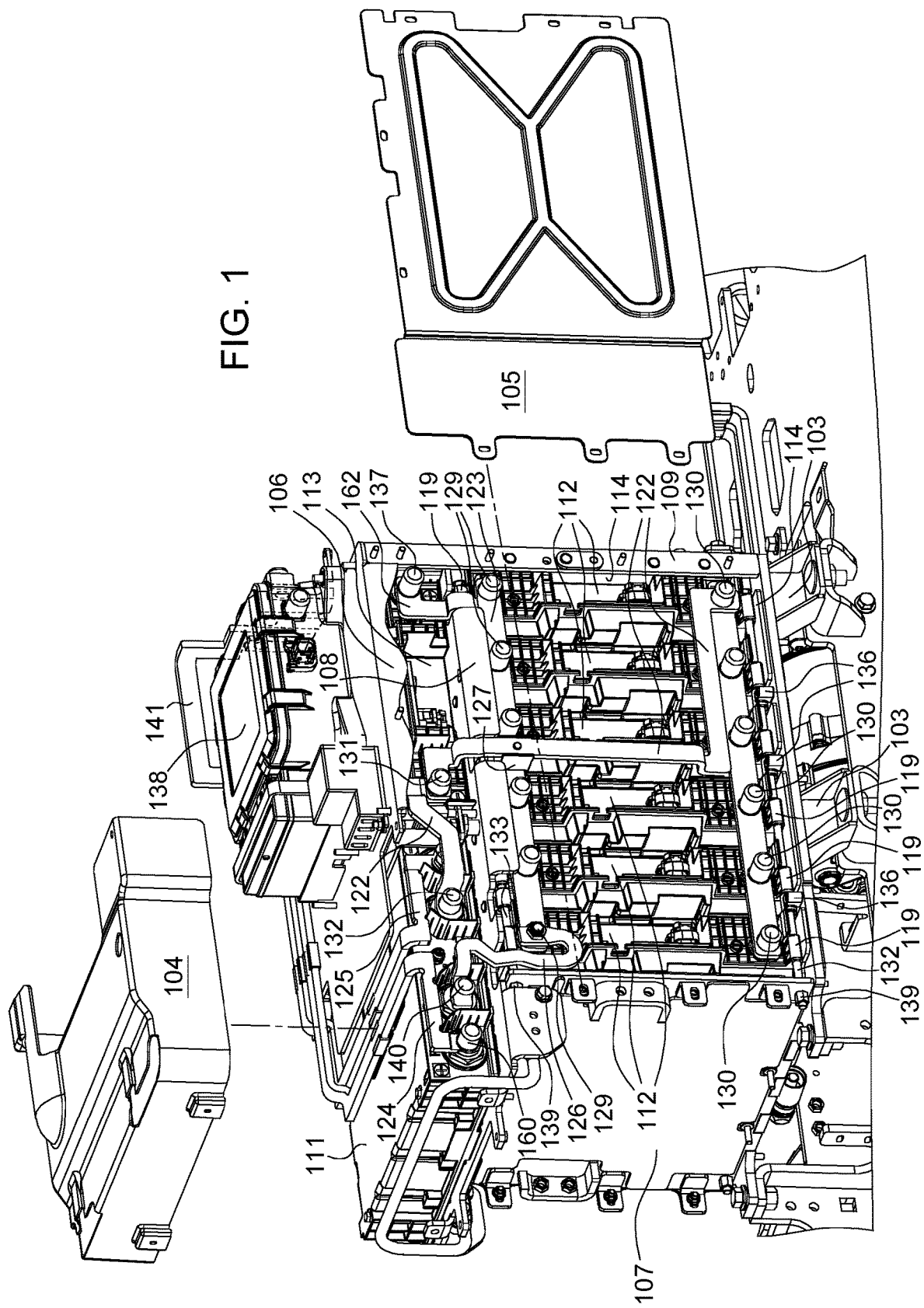
FIG. 1 is a partially exploded perspective view of a battery pack in an electric compact tractor according to a preferred embodiment of the invention.
Figure 2:
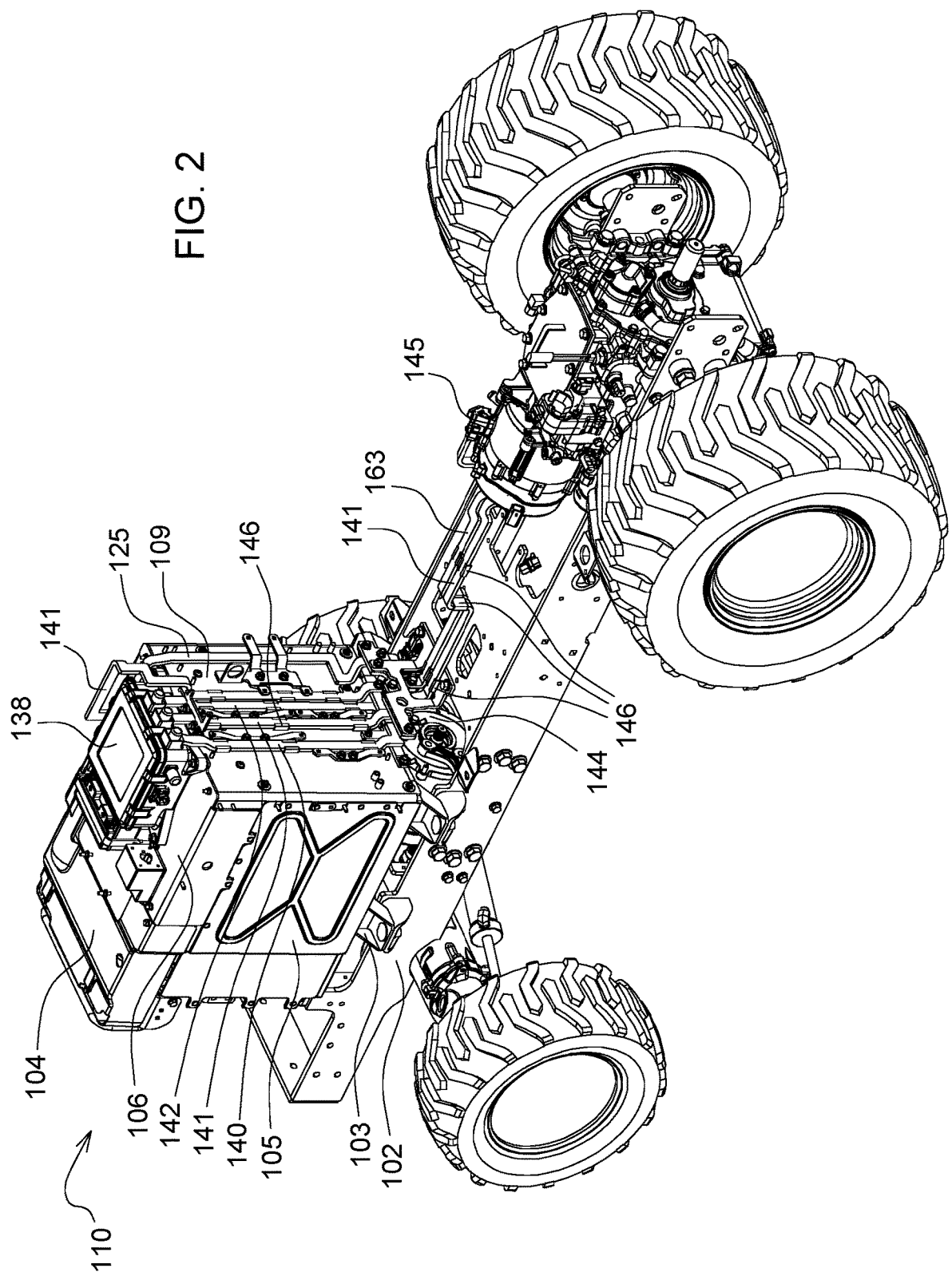
FIG. 2 is a perspective view of electrical bus bars in an electric compact tractor according to a preferred embodiment of the invention.
Figure 3:
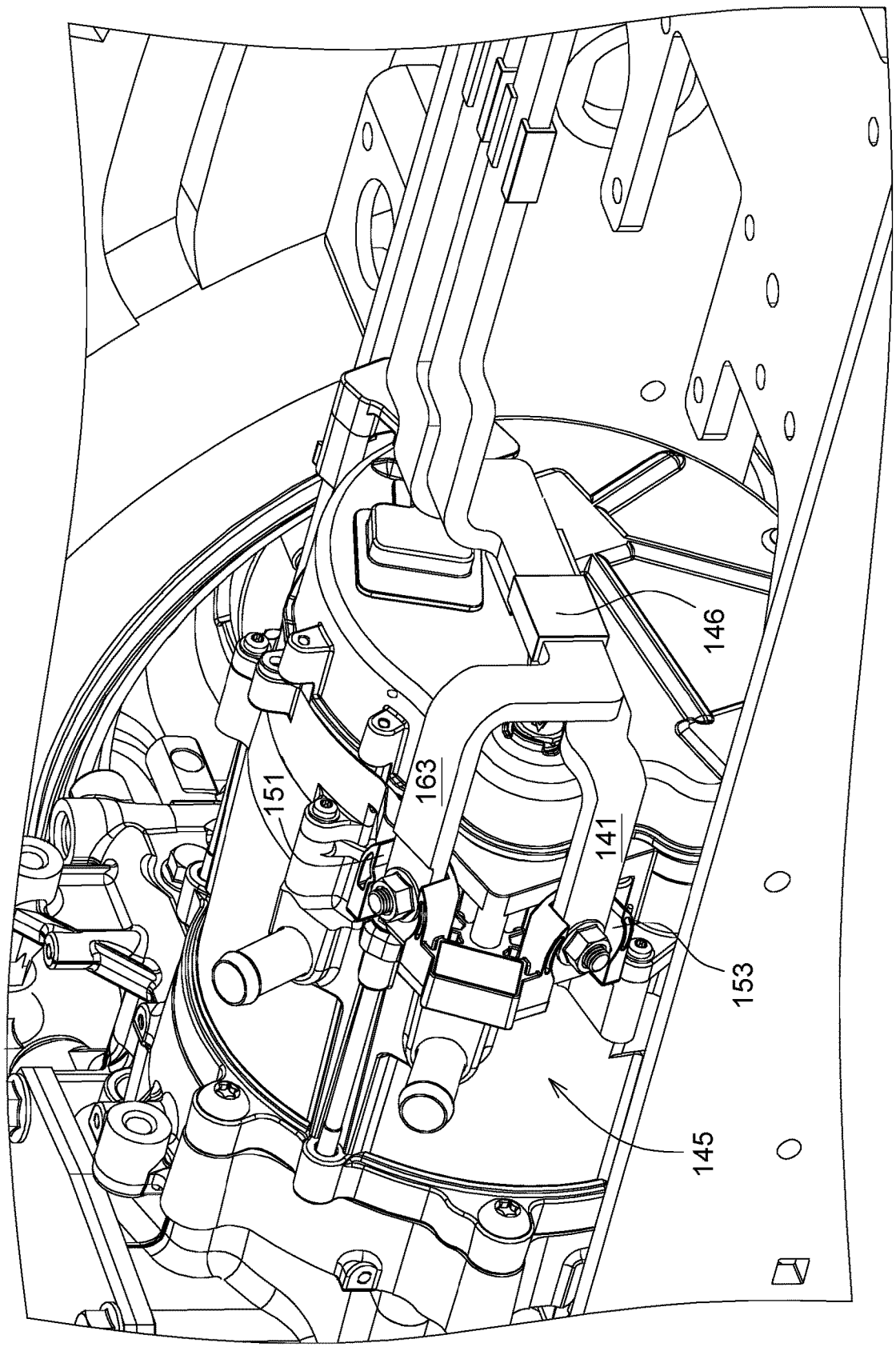
FIG. 3 is a perspective view of positive and negative electrical bus bars connected to a motor or inverter in an electric compact tractor according to a preferred embodiment of the invention.

In one embodiment shown in FIGS. 1-3, electric compact tractor 100 may include battery pack 101 mounted on tractor frame 102. The battery pack may include battery management system (BMS) 111 and a plurality of lithium ion battery modules 112, 113. For example, six lithium ion battery modules 112 may be mounted side-by-side in a vertical orientation in the battery pack. A seventh lithium ion battery module 113 and battery management system (BMS) 111 may be mounted in a horizontal orientation above the other battery modules in the battery pack. The BMS may monitor the voltage, current and temperature, ensure performance and safety, and balance charging, state of charge, state of health and functionality of the battery modules in the battery pack.

In one embodiment, electric compact tractor 100 may include battery pack 101 with a housing having a plurality of panels including horizontal bottom panel (not shown), vertical side panels 105, 107, 109, and horizontal center panel 108 extending between the upper edges of the side panels. The panels may be sheet metal with rubber isolator pads 114 on the inner surface of the panels to reinforce the housing and reduce vibration. The battery pack also may include a heat shield at the front and bottom of the battery to protect the battery from nearby heat sources. Additionally, the battery pack may include plastic cover 104 positioned over the top of the BMS.

In one embodiment, electric compact tractor 100 may include one or more rods 132, 133 that secure battery modules 112 to the battery pack panels. Each rod may pass through a slot or hole 119 on the battery module, and the ends of the rod may be secured to side panels 107, 109 with hex nuts 139 or other fasteners. Spacers on each end of the rod also may be used. Additionally, one or more supporting blocks 136 may be positioned between the rod and battery pack panel. Each supporting block may increase the stiffness of the rod against longitudinal loads from the battery modules, and may hold the rod tightly against the battery modules. For example, each supporting block may be secured to the battery pack with a threaded fastener, and the rod may be inserted through a hole in the supporting block.

In one embodiment, electric compact tractor 100 may include negative electrical bus bar 122 and positive electrical bus bar 123 connecting between the battery modules. The negative and positive electrical bus bars may provide equal resistance paths inside the battery pack. The negative electrical bus bar may connect the negative terminals 130 of battery modules 112, and also may extend vertically up and connect to negative terminal 131 of battery module 113 and negative terminal 132 of BMS 111. The positive electrical bus bar may connect the positive terminals 129 of battery modules 112, and also may include first end 126 extending vertically up to positive terminal 140 of BMS 111, and second end 162 extending vertically up to positive terminal 137 of battery module 113. Insulator 127 may be positioned between negative electrical bus bar 122 and positive electrical bus bar 123 where the negative electrical bus bar crosses over the positive electrical bus bar. Each electrical bus bar may be made of copper with tin plating, and coated with insulation material.

In one embodiment, electric compact tractor 100 may include positive electrical bus bar 124 connecting positive terminal 160 of BMS 111 to power distribution unit (PDU) 138, and negative electrical bus bar 125 connecting negative terminal of BMS 111 to the chassis or ground. Additionally, positive electrical bus bars 140, 141, 142 may connect the positive terminals of PDU 138 to traction motor 144, PTO motor 145 and steering motor (not shown) respectively. Negative bus bar 163 may connect traction motor 144, PTO motor 145 and steering motor (not shown) to the chassis or ground. Protective rubber pads or caps 146 may electrically insulate each electrical bus bar from other structures. Each electrical bus bar preferably may be 20 mm in width and 6.35 mm in thickness, copper (CDA 110 ASTM B152), with a finish of Tin plate (ASTM B545, class B) of 0.005 mm thickness, and powder coat sol epoxy (DK 15-0463 of 10-15 mils thickness.

In one embodiment, as shown in FIG. 3, electric compact tractor 100 may include one or more positive electrical bus bars 141 that only fit positive power terminal guides 153 of each motor or inverter 144, 145, and does not fit the negative terminal guide 151. For example, the end of positive electrical bus bar 141 may have a configuration that matches positive power terminal guide 153, such as a curved shape that matches a positive power terminal guide with a curved recess, or an extruded feature that fits into a slot in the positive power terminal guide. This prevents connecting an electrical bus bar to a power terminal having the incorrect polarity.

Figure 4:
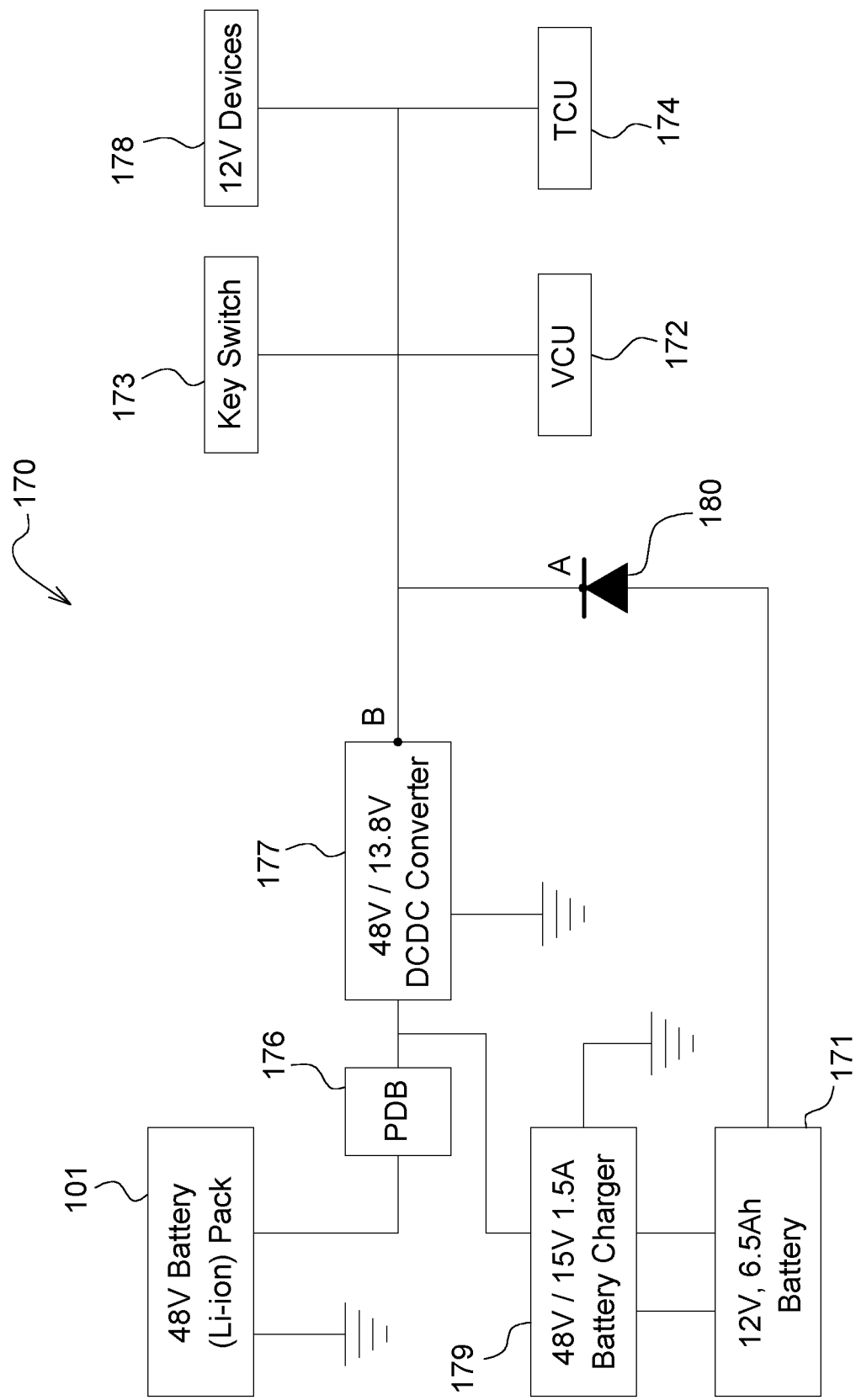
FIG. 4 is a schematic diagram of a low voltage control circuit of an electric compact tractor according to a preferred embodiment of the invention.

In one embodiment, as shown in FIG. 4, electric compact tractor 100 may include low voltage control circuit 170 to enable use of battery pack 101 having high voltage lithium ion batteries. The low voltage control circuit may include starting battery 171 to wake up vehicle control unit 172. For example, the starting battery may be a small 12V, 6.5 Ah lead acid battery. The low voltage control circuit may include key switch 173 which may be used to activate vehicle control unit 172 to verify that the neutral switch and park brake switch are engaged, send a signal to wake up traction control unit 174, and turn on the battery management system (BMS) in battery pack 101. The low voltage control circuit may include power distribution box (PDB) 176 and DC-DC converter 177 to convert 48V input voltage from the battery pack to low voltage applications such as 12V devices 178 on the electric compact tractor. The low voltage control circuit may include battery charger 179 to convert and regulate flow of current to charge starting battery 171. For example, battery charger 179 may convert 48V from the battery pack to 15V with regulated current of 1.5 Amp. The low voltage control circuit may include diode 180 to prevent or limit discharging of starting battery 171. The diode may have a 0.7V potential drop.

Having described the preferred embodiment, it will become apparent that various modifications can be made without departing from the scope of the invention as defined in the accompanying claims.

The invention claimed is:

1. An electric compact tractor, comprising:
a battery pack housing a plurality of lithium ion battery modules in side-by-side vertical positions;
a lithium ion battery module in a horizontal position above the plurality of lithium ion battery modules;
a battery management system in a horizontal position above the plurality of lithium ion battery modules;
a negative electrical bus bar connecting a plurality of negative terminals of the plurality of lithium ion battery modules and extending vertically up to connect to a negative terminal of the horizontally positioned lithium ion battery module and the battery management system;
a positive electrical bus bar connecting a plurality of positive terminals of the plurality of lithium ion battery modules and having a first end extending vertically up to connect to a positive terminal of the horizontally positioned battery management system, and a second end extending vertically up to connect to a positive terminal of the horizontally positioned lithium ion battery module.

2. The electric compact tractor of claim 1 further comprising at least one rod engaging each of the plurality of lithium ion battery modules in side-by-side vertical positions and engaging a panel of the battery pack.

3. The electric compact tractor of claim 2 further comprising a plurality of supporting blocks between the rods and a panel of the battery pack.

4. The electric compact tractor of claim 1 further comprising an insulator positioned between a crossing of the negative electrical bus bar and the positive electrical bus bar.

5. An electric compact tractor, comprising:
a plurality of lithium ion battery modules and a battery management system connected to a positive electrical bus bar and a negative electrical bus bar inside a battery pack each electrical bus bar extending horizontally and vertically between the plurality of lithium ion battery modules and the battery management system, and rearwardly from the battery pack; and
a traction drive motor and a power take off motor connected to the positive electrical bus bar and the negative electrical bus bar and powered by the lithium ion battery modules.

6. The electric compact tractor of claim 5 further comprising a low voltage control circuit including a lead acid battery, the low voltage control circuit enabling use of the plurality of lithium ion battery modules and the battery management system, and a battery charger for the lead acid battery.

7. The electric compact tractor of claim 5 wherein the plurality of lithium ion battery modules include six battery modules mounted side by side in a vertical alignment and one battery module mounted horizontally above the other six battery modules.

8. The electric compact tractor of claim 5 wherein the positive electrical bus bar has a connecting end that fits only a positive terminal guide of the traction drive motor and the power take off motor.

9. An electric compact tractor, comprising:
a plurality of lithium ion battery modules housed in a battery pack;
a pair of electrical bus bars extending horizontally and vertically between the plurality of lithium ion battery modules in the battery pack; and
a plurality of electrical bus bars extending from the battery pack to a plurality of electric motors for traction drive, implement drive and steering.

10. The electric compact tractor of claim 9 further comprising a battery management system housed in the battery pack and connected to the plurality of lithium ion battery modules by the pair of electrical bus bars.

11. The electric compact tractor of claim 9 further comprising a low voltage control circuit for turning on the plurality of lithium ion battery modules in the battery pack.

12. The electric compact tractor of claim 9 further comprising a power distribution box between the battery pack and the plurality of electric motors.

13. The electric compact tractor of claim 9 wherein one of the plurality of lithium ion battery modules is horizontally positioned above the plurality of lithium ion battery modules.

14. The electric compact tractor of claim 9 wherein the pair of electrical bus bars connecting the plurality of lithium ion battery modules in the battery pack each have an equal resistance path.

15. The electric compact tractor of claim 9 wherein the pair of electrical bus bars extending from the battery pack to the plurality of electric motors each have a connection to a positive terminal that prevents connection to a negative terminal.

\* \* \* \* \*